US007340058B2

(12) United States Patent
Jakobsson et al.

(10) Patent No.: US 7,340,058 B2
(45) Date of Patent: Mar. 4, 2008

(54) LOW-OVERHEAD SECURE INFORMATION PROCESSING FOR MOBILE GAMING AND OTHER LIGHTWEIGHT DEVICE APPLICATIONS

(75) Inventors: Bjorn Markus Jakobsson, Hoboken, NJ (US); David Pointcheval, Bagneux (FR); Adam Lucas Young, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 1096 days.

(21) Appl. No.: 09/844,121

(22) Filed: Apr. 27, 2001

(65) Prior Publication Data

US 2002/0147044 A1 Oct. 10, 2002

Related U.S. Application Data

(60) Provisional application No. 60/282,649, filed on Apr. 9, 2001.

(51) Int. Cl.
*H04K 1/00* (2006.01)
*H04L 9/32* (2006.01)
*A63F 9/24* (2006.01)

(52) U.S. Cl. .................. 380/251; 713/193; 705/67; 463/1

(58) Field of Classification Search ............. 713/200, 713/201, 193; 705/67; 380/251
See application file for complete search history.

(56) References Cited

U.S. PATENT DOCUMENTS 5,018,196 A * 5/1991 Takaragi et al. ............ 380/30
6,496,808 B1 * 12/2002 Aiello et al. ................ 705/67
6,527,638 B1 * 3/2003 Walker et al. .............. 463/25
6,577,733 B1 * 6/2003 Charrin .................... 380/251

(Continued)

OTHER PUBLICATIONS

Abramson, Bruce, "Control Stratagies for Two-Player Games", Jun. 1989, ACM Computing Surveys, vol. 21, No. 2, pp. 137-161.*
Gupta, Rajiv, Smolka, Scott, Bhaskar, Shaji, "On randomization in sequential and distrubuted algorithms", Mar. 1994, ACM Computing Surveys (CSUR), vol. 26, issue 1, pp. 7-86.*

(Continued)

*Primary Examiner*—Ayaz Sheikh
*Assistant Examiner*—Kaveh Abrishamkar

(57) ABSTRACT

Cryptography-based methods and apparatus for secure information processing are disclosed that are particularly efficient in terms of the computational resources required, and thus implementable in mobile telephones, personal digital assistants (PDAs) or other lightweight processing devices. A setup procedure is performed to permit interactions of a designated type, e.g., secure mobile gaming interactions, to be carried out between participants, e.g., one or more players and a casino. A given participant initiates a particular interaction with another participant by sending to that participant initiation information based at least in part on one or more results of the setup procedure. The other participant in turn sends response information back to the given participant, and the interaction then continues with one or more rounds each involving one or more decisions committed to by each participant. Transcripts of the interaction can be used to determine rights of the first and second participants in a publicly verifiable manner, with the rights being based upon particular results of the interaction. The invention may be configured to permit arbitrary disconnection of the lightweight devices, and provides the advantages of public verifiability, fairness and robustness. Although the invention is particularly well suited for use in secure mobile gaming applications, it is also applicable to other secure information processing applications, including contract signing and fair exchange of digital signatures.

28 Claims, 4 Drawing Sheets

U.S. PATENT DOCUMENTS

| | | | | |
|---|---|---|---|---|
| 6,636,969 | B1* | 10/2003 | Jakobsson et al. | 713/180 |
| 6,850,909 | B1* | 2/2005 | Aiello et al. | 705/50 |
| 7,031,473 | B2* | 4/2006 | Morais et al. | 380/251 |
| 7,107,463 | B2* | 9/2006 | England et al. | 713/193 |
| 7,172,508 | B2* | 2/2007 | Simon et al. | 463/42 |
| 7,210,617 | B2* | 5/2007 | Chaum | 235/51 |
| 2002/0034299 | A1* | 3/2002 | Charrin | 380/251 |
| 2003/0060286 | A1* | 3/2003 | Walker et al. | 463/42 |
| 2004/0139340 | A1* | 7/2004 | Johnson et al. | 713/194 |

OTHER PUBLICATIONS

D.L. Chaum, "Untraceable Electronic Mail, Return Addresses, and Digital Pseudonyms," Communications of the ACM, vol. 24, No. 2, pp. 84-88, Feb. 1981.

M. Abe, "Universally Verifiable Mix-net with Verification Work Independent of the Number of Mix-servers," Eurocrypt '98, LNCS 1403, Springer-Verlag, Berlin, pp. 437-447, 1998.

M. Jakobsson, "Flash Mixing," Proc. of the 18th PODC, ACM Press, New York, pp. 83-89, 1999.

S. Goldwasser et al., "Probabilistic Encryption," Journal of Computer and System Sciences, pp. 270-299, 1984.

J. Katz et al., "Complete Characterization of Security Notions for Probabilistic Private-Key Encryption," Proc. of the 32nd STOC, ACM Press, New York, pp. 245-254, 2000.

R. Canetti, "Towards Realizing Random Oracles: Hash Functions that Hide All Partial Information," Crypto '97, LNCS 1294, Springer-Verlag, Berlin, pp. 455-469, 1997.

S. Goldwasser et al., "A Digital Signature Scheme Secure Against Adaptative Chosen-Message Attacks," SIAM Journal of Computing, vol. 17, No. 2, pp. 281-308, Apr. 1988.

R. Merkle, "A Certified Digital Signature," Crypto '89, LNCS 435, Springer-Verlag, Berlin, pp. 218-238, 1990.

* cited by examiner

LOW-OVERHEAD SECURE INFORMATION PROCESSING FOR MOBILE GAMING AND OTHER LIGHTWEIGHT DEVICE APPLICATIONS

PRIORITY CLAIM

The present application claims the benefit of U.S. Provisional Application Serial No. 60/282,649, filed Apr. 9, 2001 and entitled "Secure Mobile Gaming."

FIELD OF THE INVENTION

The invention relates generally to cryptographic techniques which may be implemented by devices in computer networks, wireless networks or other types of information processing systems and devices, and more particularly to techniques for implementing secure mobile gaming and other applications in a computationally efficient manner within such systems and devices.

BACKGROUND OF THE INVENTION

Portable communication devices such as mobile telephones and personal digital assistants (PDAs) generally have limited computational resources in terms of one or more factors such as memory, processing power, communication bandwidth and network connection time. Such devices are therefore referred to herein as "lightweight" devices. Although lightweight devices are increasingly being used for applications such as sending and retrieving information over the Internet, their limited resources can become problematic for many important applications, particularly those involving secure communications implemented using cryptography. For example, the computational requirements associated with many well-known digital signature protocols can prevent their effective implementation in lightweight devices.

An example of an application that can benefit from the use of cryptographic techniques is on-line gaming implemented over the Internet or a wireless network. More particularly, there is a danger in such an application that an on-line casino or other provider of the gaming service may skew the probabilities of winning in their favor, in a manner which is not readily detectable by the users. Although this problem also exists for "real-world" casinos, it is considerably aggravated in the Internet and wireless network settings, at least in part because the on-line providers may be located in foreign jurisdictions and in any case can easily change their physical location in the event that trouble arises. The honesty of real-world casinos can generally only be verified using auditing methods. However, cryptographic techniques could be used to provide accountability in the on-line gaming context. Unfortunately, existing cryptographic techniques of a type likely to be useful in this context generally involve substantial computational overhead and as a result are not appropriate for implementation using mobile telephones and other lightweight devices.

It is therefore apparent that a need exists in the art for improved cryptographic techniques, suitable for use in secure mobile gaming and other applications, and implementable in lightweight devices.

SUMMARY OF THE INVENTION

The present invention provides cryptography-based methods and apparatus for secure information processing that are particularly efficient in terms of the computational resources required. The invention is thus suitable for implementation in mobile telephones, personal digital assistants (PDAs) or other lightweight processing devices having limited computational resources.

In accordance with one aspect of the invention, a setup procedure is performed to permit interactions of a designated type, e.g., secure mobile gaming interactions, to be carried out between participants, e.g., between one or more players and a casino, or between one or more players without involvement of a casino. A given participant initiates a particular interaction with another participant by sending to that participant initiation information based at least in part on one or more results of the setup procedure. The other participant in turn sends response information back to the given participant, and the interaction then continues in one or more rounds each involving one or more decisions committed to by each participant. Transcripts of the interaction can be used to determine rights of the first and second participants in a publicly verifiable manner, with the rights being based upon particular results of the interaction.

In accordance with another aspect of the invention, security of the particular interaction may be based at least in part on a secure probabilistic symmetric cipher (E, D) having semantic security. The cipher operates in conjunction with a one-way hash function h for which collisions are intractable to find, and a commitment function C, wherein the commitment function C provides the public verifiability of designated portions of the interaction.

In accordance with a further aspect of the invention, the interaction is configured such that if a participant processing device is disconnected during the interaction, the interaction may upon reconnection of the device be continued from a designated point at or prior to the disconnection without the participants being able to alter any partial results of the interaction attributable to a portion of the interaction up to the designated point.

In accordance with yet another aspect of the invention, the interaction may be in the form of a secure mobile gaming interaction that includes at least one game played by a player with a casino. The game may be in the form of a number of consecutive rounds of one or more moves by each of the player and the casino, with each of the rounds allowing the player and the casino to commit to at least one decision. The game may be characterized by a player game tree structure associated with the player and a casino game tree structure associated with the casino, with each of the game tree structures including a number of nodes, and each of at least a subset of the nodes including a block of data that determines randomness contributed to a corresponding round of the game by the corresponding player or casino. Also associated with each of at least a subset of the game nodes are decision preimage values that encode possible decisions to be made in the game.

The invention in an illustrative embodiment provides the advantages of public verifiability, fairness and robustness, and as previously noted may be configured to permit arbitrary disconnection of participant devices. Although the invention is particularly well suited for use in secure mobile gaming applications, it is also applicable to other secure information processing applications, including contract signing and fair exchange of digital signatures.

DETAILED DESCRIPTION OF THE INVENTION

The present invention will be illustrated below in conjunction with an example information processing system in which the techniques of the invention are implemented in a secure mobile gaming application using lightweight devices such as mobile telephones or personal digital assistants (PDAs). The lightweight devices in this example system are configured to communicate with one or more servers or other information processing entities over a communication network such as a cellular network or the Internet. It should be understood, however, that the invention is more generally applicable to any type of electronic system or device application in which it is desirable to provide secure information processing in a computationally efficient manner.

Processing System

Figure 1:
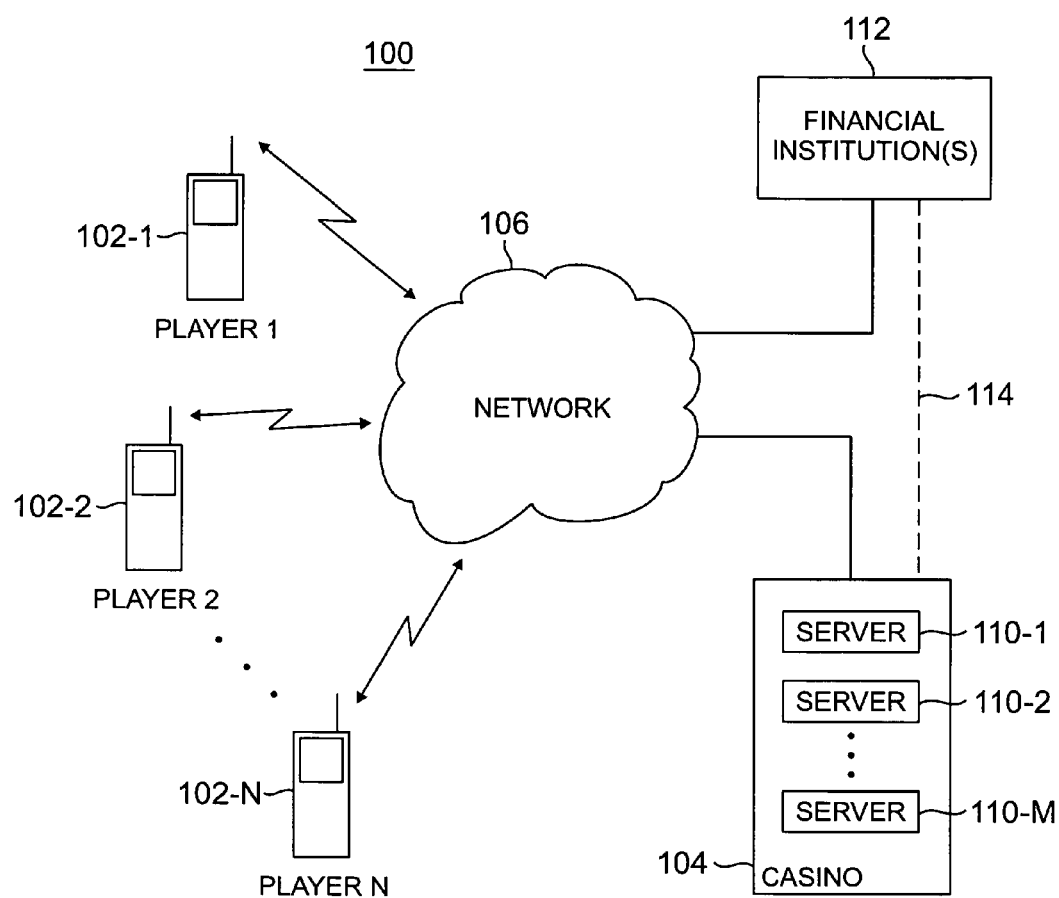
FIG. 1 shows a block diagram of an example information processing system configured to provide secure mobile gaming in accordance with an illustrative embodiment of the invention.

FIG. 1 shows an exemplary processing system 100 in which a secure mobile gaming process is implemented in accordance with an illustrative embodiment of the invention. The system 100 includes a set of N player devices 102-1, 102-2, ... 102-N, each of which communicates with a casino 104 over a network 106. The casino 104 in this embodiment comprises a set of M servers 110-1, 110-2, ... 110-N, but in other embodiments could be implemented as a single server or as another suitable arrangement of one or more processors or other processing elements. The system 100 further includes a set of one or more financial institutions 112 that may be coupled to the network 106 as shown, and may also or alternatively have other connections with system elements, such as a connection 114 with casino 104.

Although illustrated in this embodiment as mobile telephones or PDAs, one or more of the player devices 102 may be implemented as desktop or portable personal computers, television set-top boxes or any other types of devices capable of transmitting or receiving information over network 106. In addition, there may be multiple devices associated with a particular player. For example, a given player may have a mobile telephone as well as a desktop or portable computer, and may utilize both devices for secure gaming interactions with casino 104, as will be explained in greater detail below.

The network 106 may be implemented as a wireless network, a global data communications network such as the Internet, a private "intranet" network, an "ad-hoc" network or any other suitable data communication medium, as well as portions or combinations of such networks or other communication media.

It should be understood that although particular arrangements of player devices 102 and casino 104 are shown in the FIG. 1 embodiment, the invention is more generally applicable to any number, type and arrangement of such elements.

Figure 2:
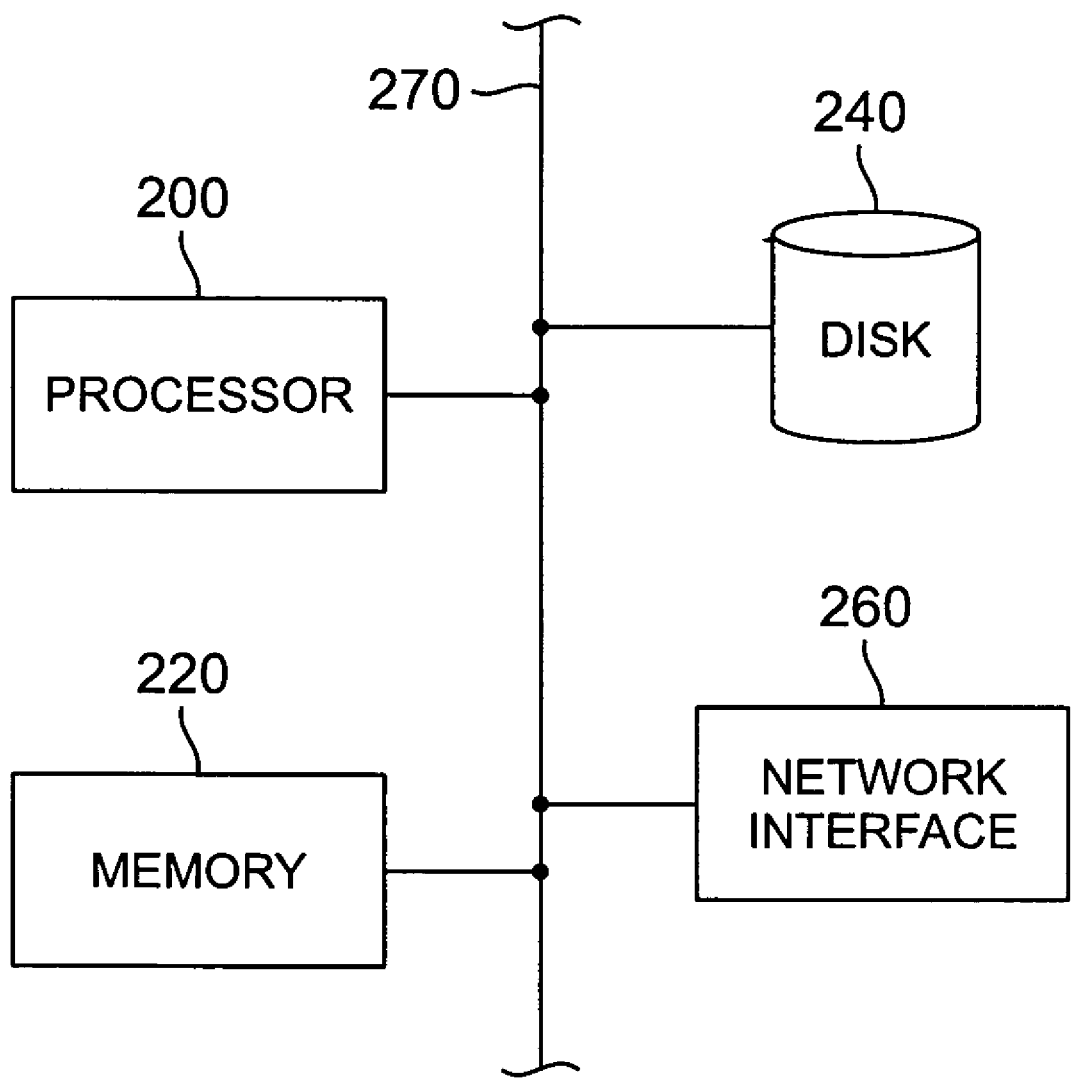
FIG. 2 is a block diagram of one possible implementation of a given one of the processing elements of the system of FIG. 1.

FIG. 2 shows one possible implementation of a given one of the information processing elements of system 100. The implementation in FIG. 2 may thus represent at least a portion of one or more of the player devices 102, the casino 104, or the financial institution(s) 112. This implementation includes a processor 200, an electronic memory 220, a disk-based memory 240, and a network interface 260, all of which communicate over a bus 270. The processor 200 may represent a microprocessor, a central processing unit, a digital signal processor, an application-specific integrated circuit (ASIC), or other suitable processing circuitry.

It should be emphasized that the implementation shown in FIG. 2 is simplified for clarity of illustration, and may include additional elements not shown in the figure. In addition, other arrangements of processing elements may be used to implement one or more of the elements of the system 100.

Subsequent references herein to financial institution(s) 112 will for simplicity and clarity refer to a single financial institution, with the understanding the invention can be implemented so as to involve multiple such institutions.

The elements 102 and 104 of system 100 execute software programs in accordance with the invention in order to provide secure mobile gaming in a manner to be described in detail below. The invention may be embodied in whole or in part in one or more software programs stored in one or more of the element memories, or in one or more programs stored on other machine-readable media associated with one or more of the elements of the system 100.

Secure Mobile Gaming

The present invention in the illustrative embodiment provides low-overhead techniques for implementing secure mobile gaming in the system 100 of FIG. 1. The secure mobile gaming in this embodiment is implemented using cryptographic techniques that allow for public verification of outcomes by all participants so as to guarantee fairness in the system.

In the illustrative embodiment, it is assumed without limitation that the players and the casino are mutually distrustful parties, and that any collusion of such participants is possible. For example, the participants may collude to perform any of a number of different sequences of malicious operations, including setups, game rounds, disconnections, and financial institution deposits. It will be shown below that the illustrative embodiment is secure against such collusion, based on reasonable assumptions regarding the behavior of the participants. It should be noted that these and other assumptions referred to herein are intended for illustrative purposes only, and should not be construed as limiting the scope of the invention in any way.

The invention will be illustrated primarily using games in which a player can play with "open cards" without this reducing his or her expected profit. The term "open cards" as used herein refers generally to publicly known randomness, and not necessary to physical cards per se, and indicates that in a worst case scenario, as soon as the player learns the random outputs or partial outputs of the game, so does the casino. However, the invention is readily applicable to other games not involving open cards, such as poker, through the use of public key based protocols. For example, a deck of cards may be shuffled using mix networks as described in D. Chaum, "Untraceable Electronic Mail, Return Addresses, and Digital Pseudonyms," Communications of the ACM, 24(2):84-88, February 1981, M. Abe, "Universally Verifiable Mix-Net with Verification Work Independent of the Number of Mix-Servers," Eurocrypt '98, LNCS 1403, Springer-Verlag, Berlin, pp. 437-447, 1998, and M. Jakobsson, "Flash Mixing," Proc. of the 18th PODC, ACM Press, New York, pp. 83-89, 1999, all of which are incorporated by reference herein.

Game Setup

The setup of an example game that may be played in the system 100 by one or more of the players interacting with casino 104 over network 106 will now be described. In accordance with the invention, a given game is optimized with respect to communication and computation overhead in the system 100 through the use of a tree-based hash structure for commitments to randomness and game decisions. For each player, and each type of game offered by the casino, two such structures are computed, one for the player, and one for the casino. It should be noted that it is also possible to construct a new game from two or more traditional games, where a first decision of a player in a new game selects what traditional game to play, which would allow use of the same structure for multiple games.

To minimize the amount of storage required by the player devices, the casino may store the above-noted structures, and send over portions of the structures to the player devices as required. The player structures will generally be stored in an encrypted manner, thereby preventing the casino from evaluating the game function on the structures until the game is initiated by the player. In case of conflict, e.g., where the player believes that he or she received incorrect data from the casino, it is important that the player can locally generate the data at the player device, given a secret seed and a counter corresponding to the contested data.

Let (E, D) be a secure probabilistic symmetric cipher with semantic security. Examples of such ciphers are described in S. Goldwasser et al., "Probabilistic Encryption," Journal of Computer and System Sciences, 28:270-299, 1984, and J. Katz et al., "Complete Characterization of Security Notions for Probabilistic Private-Key Encryption," Proc. of the 32nd STOC, ACM Press, New York, 2000, which are incorporated by reference herein. In addition, let h be a hash function for which collisions are intractable to find, and which therefore constitutes a one-way function, as described in, e.g., M. Luby, "Pseudorandomness and Cryptographic Applications," Princeton University Press, p.27, 1996, which is incorporated by reference. The one-way function is hard to invert on average, i.e., for any poly-time ensemble A, the probability that A(h(X)) is an inverse of h(X) is small, where X is drawn uniformly from the domain of h. Furthermore, let C be a perfect commitment. This perfect commitment may be a hash function which hides all partial information, such as that described in R. Canetti, "Towards Realizing Random Oracles: Hash Functions that Hide All Partial Information," Crypto '97, LNCS 1294, Springer-Verlag, Berlin, pp. 455-469, 1997, which is incorporated by reference herein. Finally, it is assumed that the participants use a signature scheme that is substantially unforgeable, such as that described in S. Goldwasser et al., "A Digital Signature Scheme Secure Against Adaptative Chosen-Message Attacks," SIAM Journal of Computing, 17(2):281-308, April 1988, which is incorporated by reference herein.

The term game type will be used to identify the rules governing the interaction between players and casino. An example of a particular game type is blackjack. Particular instances of a given game type are referred to as games or game rounds, where the latter signifies that a complete instance of a game corresponds to multiple rounds, between which there are state dependancies. Each game, or game round, may be comprised of some number of consecutive moves, each one of which allows the players and the casino to commit to a decision. A game node is a block of data that determines the randomness contributed to a game round by its holder. Values of a game node that encode possible decisions to be made are referred to as decision preimages for the game. Finally, a game tree is a collection of game nodes, arranged in the hierarchy of a tree for purposes of efficiency.

At the time of setup, the player and the casino agree on the size of the game tree, and a number N of nodes corresponds to the maximum number of rounds of the game type in question that can be played without re-performing the setup.

Figure 3:
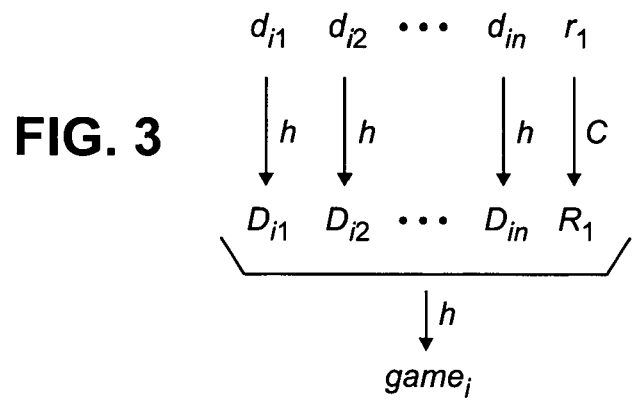
FIGS. 3, 4 and 5 show game node, game tree and game agreement structures in accordance with the invention.
Figure 4:
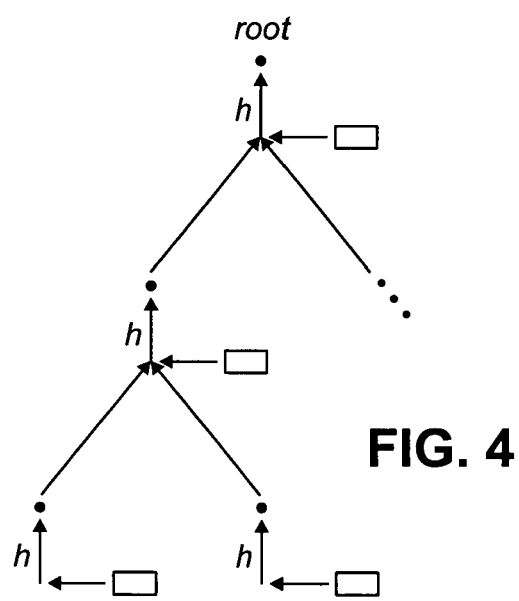
Figure 5:
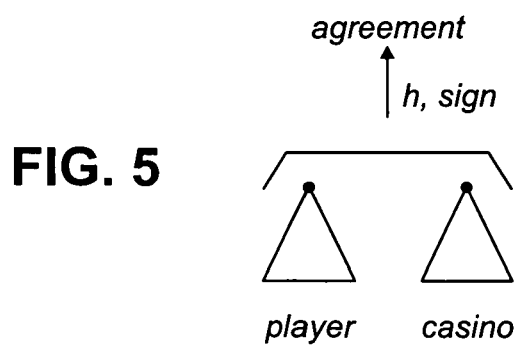

FIGS. 3, 4 and 5 show example game node, game tree and game agreement structures in accordance with the illustrative embodiment of the invention. These structures will be described in greater detail below.

Different games generally require different numbers of player choices to be made. For example, slot machines allow for few or none; blackjack for several; and roulette for a tremendous number (given the vast number of combinations with which a player can bet). In accordance with the invention, for each type of game in question, players and the casino commit to decisions by revealing decision preimages according to an encoding technique. The encoding technique may be similar to that used in known digital signature protocols, such as those described in R. Merkle, "A Certified Digital Signature," Crypto '89, LNCS 435, Springer-Verlag, Berlin, pp. 218-238, 1990, and L. Lamport, "Constructing Digital Signatures from a One-Way Function," Technical Report CSL 98, SRI Intl., 1979, both of which are incorporated by reference herein.

In one possible implementation of the above-noted decision commitment process, a player in the setup phase of the game selects n uniformly distributed random numbers $d_{i1}, \ldots, d_{in}$, for each node i of the game tree, where as previously noted each such node corresponds to one round of the game. The numbers $d_{i1}, \ldots, d_{in}$ allow the player later to make choices by revealing preimages in one or more moves, according to the above-noted encoding technique. The player also selects a random number $r_i$ uniformly at random for each node. All of these random numbers are assumed to be of size 160 bits or more, in order to avoid the well-known "birthday paradox" problem. Indeed, in case of a collision, an opponent could claim that another decision has been taken by the player. The player then computes a value $game_i = <h(D_{i1}, \ldots, D_{in}), R_i>$, where $D_{ij}=h(d_{ij})$ and $R_i+C(r_i)$. The notation $preimage_i=(d_{i1}, \ldots, d_{in}, r_i)$ denotes the secret preimage to $game_i$. FIG. 3 illustrates this game node structure.

The generation of the game tree then proceeds as follows. The player computes a game tree structure $S_{player}$ comprising N nodes. Each of the nodes other than the root is connected to one parent node, and each of the nodes other than the leaves are connected to two children nodes. In addition, each of the nodes is connected to one game node given by the above-described value $game_i$ for the ith such node. The game nodes are enumerated according to their depth-first traversal order in the tree. Each node in the tree has a value which is the hash of: (i) all of the values of its children; (ii) its game node value; and (iii) a descriptor game that describes what game type that it corresponds to. FIG. 4 illustrates this game tree structure.

Let $root_{(player, game)}$ be the value describing the root of the tree for the game in question. Each player constructs one such value $root_{(player, game)}$ for each game type he or she wishes to be able to play, and the casino prepares a similar structure (unique to the game type and the player in question) for each player structure. Let $root_{(casino, game)}$ describe the root of this latter tree. The player and casino game tree structures may be of slightly different formats if the player and casino have different number of maximum choices per round.

Let $agreement_{(casino, player)}$ be a document comprising the above-described root values for the player and the casino, a hash value on the game function $f_{game}$, and signatures on this information by both the casino and the player, as is illustrated in FIG. 5. It is assumed without limitation that certified or otherwise publicly registered public keys are used for the signatures.

The value $agreement_{(casino, player)}$, along with any relevant certificates or related information, is stored by both the player and the casino. For example, the player can store it in a memory of its corresponding player device 102, and the casino can store it in a memory associated with one of the servers 110. It should be noted, however, that the player need not store the value directly on the player device 102, but could instead store it in any manner that allows it to be retrieved in case of conflict with the casino.

The player may store his or her game trees on the corresponding player device 102, or may alternatively encrypt these in portions corresponding to game nodes, and have these stored by the casino. In the latter case, let $E_i = E_{K_{player}}(preimage_i, red_i)$ be the encryption of $preimage_i$ under the symmetric key $K_{player}$, using redundancy $red_i$ of sufficient length to determine with an overwhelming probability whether a ciphertext is correctly decrypted. For example, one may choose $|red_i|=80$, and assume that the index i is a part of $red_i$.

The casino may store records of the format (i, $E_i$, $game_{player, i}$, $game_{casino, i}$) along with a counter cnt indicating what games have been played. This counter is specific to the player and the type of game associated with the node. The notation in the illustrative embodiment is simplified by considering only one counter, but it should be understood that the invention can be implemented using multiple such counters. The casino also stores all the functions $f_{game}$.

The key $K_{player}$ is stored by the player in the corresponding player device 102, along with the counter cnt. The player also preferably keeps a backup of the symmetric key, e.g., as a file on a home computer or other device other than player device 102, as a passphrase used to generate the key, etc. Furthermore, the player stores either the functions $f_{game}$ of the games he or she is interested in playing, or hash values of these functions. It is possible but not necessary for the player also to have the value cnt backed up with regular intervals, e.g., on a home computer.

The financial institution 112 will generally store elements corresponding to payment requests, allowing it to detect duplicates and inconsistencies, in a manner to be described in greater detail below.

It should be noted that if the preimage $preimage_1 = (d_{11}, \ldots, d_{1n}, r_1)$ is selected by the player as the output of a pseudorandom number generator (PRNG) whose input is ($seed_{player}$, $game_1$), then this preimage can be generated (and re-generated) locally on the corresponding player device 102 when required. Depending on the difference in speed and power consumption between the PRNG and the decryption function, and taking the communication costs into consideration, it may be beneficial not to use the casino as a repository for encrypted game nodes, but always to recreate these locally, from the seed, when needed.

Advantageously, in the illustrative embodiment, auditing organizations and other entities can review the game functions $f_{game}$ (or crucial portions of these) to ascertain that they correspond to fair games. Here, fair is simply used to mean "in accordance with the disclosed rules." The rules specify the different events corresponding to the outcomes of the games, their probabilities of occurrence, and the costs and payoffs associated with the game. If an auditing organization decides that the game described by $f_{game}$ is fair in this sense, it can issue a digital certificate on $f_{game}$ along with a description of the rules. This certificate may either be publicly verifiable, or verifiable by interaction with some entity, such as the auditing organization. Players may thus verify the fairness of games by verifying the validity of the corresponding certificates.

Game Playing

Figure 6:
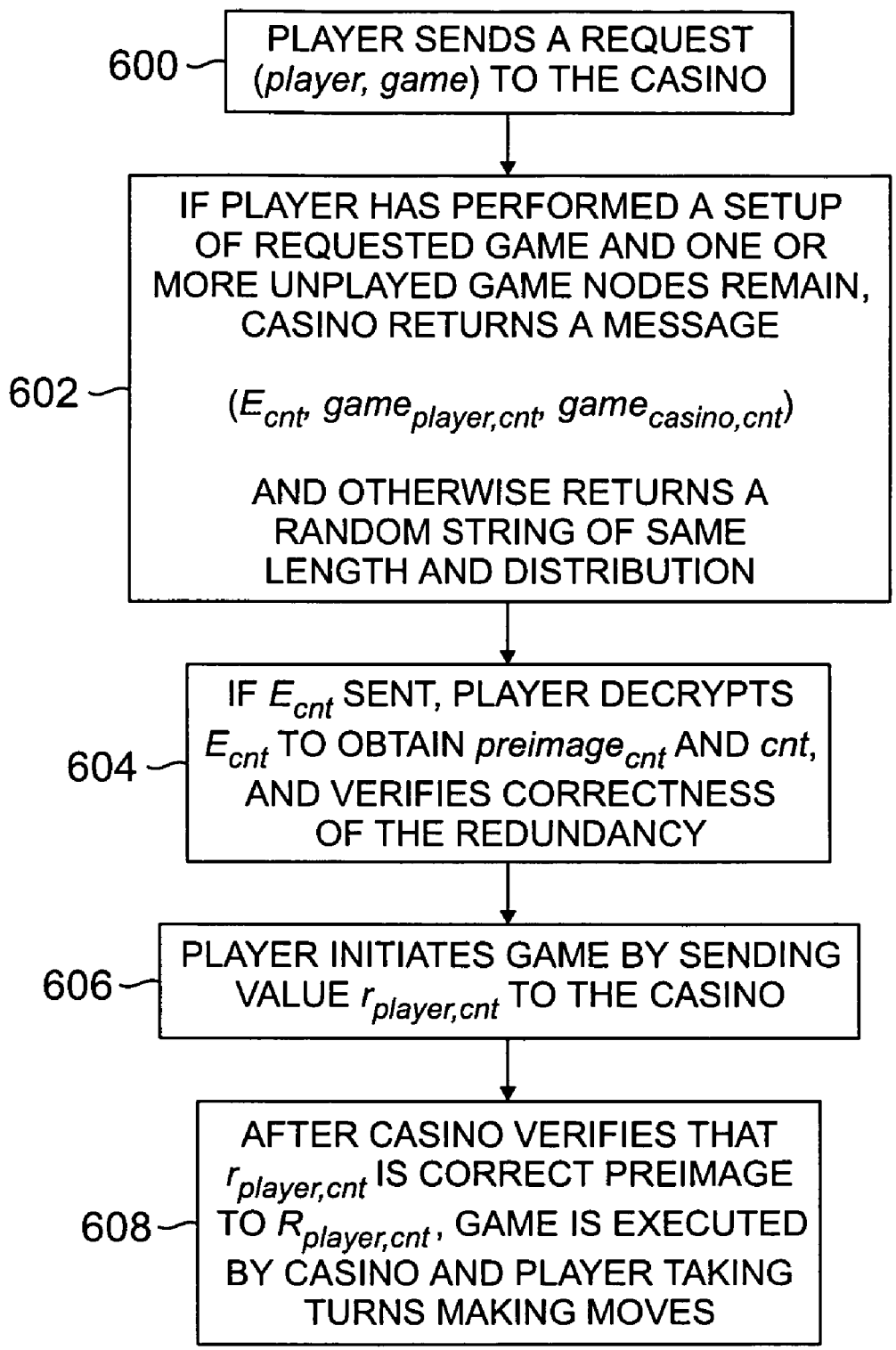
FIG. 6 is a flow diagram showing a portion of a secure mobile gaming process in the illustrative embodiment of the invention.

FIG. 6 is a flow diagram illustrating a portion of a secure mobile gaming process in accordance with the invention. The portion of the process shown includes steps 600, 602, 604, 606 and 608, each of which will be described below. Although described for a game involving a single player, the techniques can be readily extended to games involving multiple players.

In step 600, a player initiates the process by sending a request (player, game) from the corresponding player device 102 to the casino 104 via the network 106, where player is the name or pseudonym of the player, and game is the name of the game the player wishes to initiate. The player in order to initiate this process must have performed the setup procedure for the requested game as previously described. It should be noted that the request in the illustrative embodiment is not authenticated. Games are preferably enumerated so as to be selectable in a depth-first manner, which will tend to minimize the amount of communication required between the player device and the casino.

Step 602 indicates that if player has performed a setup of the game game and some unplayed game nodes of this type remain, then the casino returns a message:

($E_{cnt}$, $game_{player, cnt}$, $game_{casino, cnt}$)

If the appropriate setup has not been performed or there are no unplayed game nodes of this type remaining, the casino returns a random string of the same length and distribution.

In step 604, if $E_{cnt}$ has been sent by the casino, the player decrypts $E_{cnt}$ to obtain $preimage_{cnt}$ and cnt, and verifies the correctness of the redundancy.

The game can then be executed as indicated by the steps enumerated in the game-playing protocol given below. The first two steps of the game-playing protocol correspond generally to steps 606 and 608 of FIG. 6.

1. The player initiates the game by sending the value $r_{player, cnt}$ to the casino. The casino verifies that this is the correct preimage to $R_{player, cnt}$ and halts the process if it is not the correct preimage. Note that $R_{player, cnt}$ is part of $game_{player, cnt}$, which as previously noted is available to the casino.

2. The casino and the player take turn making moves:
   (a) The casino sends to the player decision preimages encoding its move.
   (b) The player is presented with the corresponding choices via an interface at the player device 102, and a given choice selected by the player is translated into one or more preimages that are sent to the casino.

Steps 1 and 2 above are executed one or more times, in accordance with the rules of the game. Recipients of values verify the correctness of these values, and if any value is incorrect, then the recipient requests that the value be resent. All preimages are temporarily stored (until the completion of step 4 below) by both casino and player.

3. The casino responds with $r_{casino,cnt}$, which is verified correspondingly by the player.

4. The function $f_{game}$ is evaluated on the disclosed portions of $preimage_{payer,cnt}$ and $preimage_{casino,cnt}$. The output is presented to the player and the casino, and the appropriate payment transcripts are sent to the financial institution.

5. The player and the casino updates the counter cnt, along with other state information.

The outcome of the function $f_{game}$ depends on some portion of the values in $preimage_{player,cnt}$ and on $r_{casino,cnt}$. In games where the randomness is not public until the end of the game (e.g., when the hand is shown only at the end of the game), the outcome also depends on the actual values of the decision preimages given by the player and the casino (as opposed to the choices alone). This also holds if step 2 above includes several moves (i.e., an iteration of the disclosing of decisions by the player and casino). In such a case, h is preferably selected to satisfy the same requirements as C, i.e., be a perfect commitment that hides all partial information. Using the decision preimages to derive randomness (used in combination with values disclosed in step 3 to avoid predictability), allows the introduction of new random values throughout the game. The process is generally configured such that one cannot compute any non-trivial function of an outcome that depends on a value without access to the value itself.

Example: Slot Machines

Slot machines are a simple example in that one only needs two random strings, one for the player and one for the casino, where an exclusive-or (XOR) of these values may be used to directly determine the outcome of the game. For slot machines that allow one or more wheels to be locked and the other rotated again, this simply corresponds to letting a first-round decision of a game node encode "keeping" an outcome from the previous game node. The result of stopping a wheel from spinning at some point can be ignored in terms of game impact, as it does not alter the distribution of the outcome.

Example: Variable Length Decisions

In a game such as roulette, the player can place bets on various portions of the board, in a large number of configurations. It is possible either to limit the maximum bet to keep the number of combinations down, or to use several consecutive game nodes to express one bet. The latter can be implemented in a secure manner using the techniques of the invention.

Let one of the decision preimages, when revealed, mean "link with next game node," and let another decision preimage mean "do not link with the next game node." Clearly, the player will only reveal one of these. After the conclusion of the game, one generally has to deposit all game nodes in a sequence, along with the game node of the previous game unless already known by the financial institution, and each of these game nodes will need to have exactly one of the above-mentioned preimages revealed. This allows the player to encode arbitrary variable length decisions, as such decisions will be encoded by all the preimages of all the "linked" game nodes.

Regardless of whether or not game nodes are linked, if a game allows variable length decisions, then either there must be some decision preimages that encode the length of the decision, or both player and casino need to submit game transcripts to the financial institution, to avoid a situation in which only a prefix decision is submitted.

Example Multi-Player Games

As noted above, the present invention can be applied to multi-player games. In order to play a multi-player game where the outcome of each player's game depends on the strategies of other players, each player may use one portion of the decision preimage field to encode the public values of the game nodes of the other players participating in the game. The game would then start by a round in which all players open up preimages corresponding to their view of the game nodes of the other players, and then proceed substantially in the manner of the single-player game as previously described.

Example Drawing Cards Face-Down

The invention can also be applied to games in which cards are drawn face-down. In a game such as poker, the players of the game (of which the casino may be one) take turns making decisions (specifying what cards to keep, and how many new cards to request), and obtain cards from a common deck. The values of these cards are not publicly available until the end of the game. The decision preimages may therefore be used both to commit to the decisions and to provide randomness determining what cards are drawn. Where the casino deals the cards, and is trusted not to collude with other players, it is possible to let the casino know the hands of the different players, which allows for a simple solution, but which raises the concern of collusions between the players and the casino. Public key based methods may be used to avoid this problem, although such methods generally require substantial computational resources.

Handling Disconnections

Disconnections are handled differently depending on the step of the above-described game-playing protocol in which the disconnection occurs. The casino generally takes a relatively passive role in reacting to disconnections, as it will ignore disconnections before the execution of step 2 of the game-playing protocol (and merely reset its internal state to what it had before the initiation of the first protocol step). Disconnections during step 2, where the player commits to playing the game, are handled by the financial institution acting as an intermediary between the player and casino (if wanted by the player), or by charging the player according to the most expensive outcome given the transcript seen (if the player refuses connection). The casino will handle disconnections after step 2 by executing its parts of steps 4 and 5 of the game-playing protocol. It also stores the player's decision preimages, if received.

If the player detects a disconnection of the game before executing step 2 of the game-playing protocol, then the player will reset his state to the state held at the beginning of the protocol. If the player detects the disconnection after that stage, then the player will request a replay, and will perform the following replay protocol:

1. The player sends the casino the string (player, cnt, $r_{player,cnt}$, $D_{casino}$, $D_{player}$)

In the above, $D_{casino}$ represents the decision preimages of the casino (recorded by the player), and $D_{player}$ those of the player. Note that these are the choices that have already been made. The player does not get to make a new game decision for the reconnected game, as this is just a continuation of the disconnected game.

2. The casino verifies the correctness of the received values with respect to the game nodes $game_{casino,cnt}$ and $game_{player,cnt}$. If not all values are correct, then it halts the process.

3. If the casino has previously recorded decision preimages other than those received in the current protocol, then it selects the set $D'_{player}$ that maximizes its benefit.

4. The participants perform steps 3-5 of the game-playing protocol, both of them sending payment-invoking transcripts to the financial institution. If different transcripts are received by the financial institution, a particular type of conflict resolution is implemented by the financial institution before making the payments, as will be described below.

If the above replay protocol fails, the player may attempt it with the financial institution serving as an intermediary.

Payment Generation

The financial institution can determine appropriate charges and the credits by evaluating the game function on the provided transcripts. The transcripts may thus be used not only to determine who won the game but also how much that participant won. The latter may depend both on the outcome of the game, and on decisions by the player and casino, such as how much is bet.

A payment request by the casino may comprise the following:

1. The player identifier (player), the value cnt, the value $game_{player,cnt}$, and the player decision preimages $D_{player,cnt}$.

2. All values on the path from the game node $game_{player,cnt}$ up to the root $root_{player,game}$; the game nodes $game_{player,i}$ of every node in the game tree that is a sibling with any of the nodes on the above-mentioned path; and the value $agreement_{casino,player}$.

The consistency of these values is checked by the financial institution, and verification is made that the values have not previously been submitted (if the values have been submitted, a conflict resolution protocol to be described below may be executed). The financial institution then transfers funds from the player's account to the casino in accordance with the cost of playing a game as governed by the rules, and the decision preimages $D_{player,cnt}$. Note that in this embodiment the verification does not include verifying who won the game, as the approach taken here is to charge for each game, including games in which the user wins.

In the above payment request, only the first triple comprising the values (player, cnt, $D_{player,cnt}$) need be sent, unless the other values are requested by the financial institution. The financial institution stores all values received, and only requests the further information if it is not available.

A payment request by the player may comprise the following:

1. The player identifier (player), the value cnt, the value $game_{player,cnt}$, and the player decision preimages $D_{player,cnt}$.

2. The values $r_{player,cnt}$, $r_{casino,cnt}$, and the casino decision preimages $D_{casino,cnt}$.

3. All values on the path from the game node $game_{player,cnt}$ up to the root $root_{player,game}$; the game nodes $game_{player,i}$ of every node in the game tree that is a sibling with any of the nodes on the above-mentioned path; and the value $agreement_{casino,player}$.

As in the casino payment request, the last portion is not sent unless requested. If the casino is storing information for the player, and the information is requested by the financial institution, then the casino will be contacted by the financial institution and requested to provide the information. If it refuses, then a special conflict resolution protocol may be run, as will be described below. When all the necessary information is received, the financial institution verifies the same, evaluates the function $f_{game}$, and determines the appropriate payment. It then verifies whether this transcript has already been deposited. If it has, then it runs the conflict resolution protocol below. Otherwise, it credits the accounts accordingly.

In the above payment process, the financial institution indexed payment requests by the value $r_{player,cnt}$ which has to be submitted for all requests. Note that the financial institution may require both casino and player to deposit the transcript corresponding to a game in order to avoid the depositing of "partial" transcripts, i.e., transcripts where some of the decision preimages revealed by player or casino are not reported. Depending on the nature of the game, deposits may routinely be performed by both parties, or be performed on demand by the financial institution.

Conflict Resolution

Conflict resolution is performed by the financial institution in the following cases:

1. Two or more identical deposits received for the same game. If more than one payment request for a particular game is deposited, then only the first is honored, and all duplicates are ignored.

2. Two or more different deposits for the same game. If the financial institution receives correct transcripts corresponding to two or more different outcomes of a game, i.e., transcripts for which there are different sets of decision preimages recorded, then it decides as follows. If there are two or more different decision transcripts of the casino, but consistent versions for the player decision transcripts, then it judges in favor of the player. If, on the other hand, the casino preimages are consistent, but the player images are not, then it judges in favor of the casino. If neither is consistent, then alternate resolution mechanisms may be used.

3. Incomplete deposit. If a transcript does not contain all the decision preimages required to complete the game, then the financial institution will rule in favor of the participant submitting the transcript after having tried to obtain the transcript from the other participant, and failed to have the participants complete the game with the financial institution as an intermediary.

4. The casino refuses to disclose values. If the financial institution requests path information from a casino during the deposit by a player, and the casino refuses to provide this information, then the player's account is credited with the amount corresponding to the deposited game transcript (possibly after some reasonable hold period). The casino's account is charged the same amount, plus possible fines.

5. Player out of funds. If the casino deposits a game transcript for which there are insufficient funds, it is notified of this, and may (but need not) temporarily lock the access of the player to the games. In fact, the financial institution can alert the casino of a low player balance if the balance falls below a particular preset level, which may to be established by agreement between the player and casino during account setup, or by implicit agreement for playing any particular game. Any deposits made after the casino has been notified of the player being out of funds are put on hold, and are credited and charged only after a sufficient balance is available.

6. Casino out of funds. If the casino's balance falls below a first preset level, then each player depositing transcripts is paid according to the outcome, but is barred from receiving any further payments from the casino (until service by the casino is reestablished). The player is notified of this condition, and the corresponding player device may temporarily disable the gaming service. If the casino's balance falls below a second and lower level, then all registered players are notified that no further deposits will be accepted after a designated cut-off time, and the player devices may each disable the service.

Transferring State

In the illustrative embodiment, there are generally only two parameters that need to be transferred between devices in order to allow the player to transfer the game state between the devices. One is the secret master key used to decrypt the received transcripts; the other is the counter determining what games have been played and which ones remain to be played. The master key can be installed on both devices during the above-described setup procedure, or may be generated "on the fly" from a passphrase.

The casino may be permitted to store the counter, for transmission to the player when requested. Although this would enable the casino to perform rewinding attacks, such attacks can be defended against as follows. If the player notifies the financial institution of the counter at the end of each game or sequence of games, the financial institution can verify that the corresponding transcripts are deposited by the casino within some short period of time (shorter than the period between two game sessions with an intermediary state transfer). If the casino deposits two different game nodes (potentially with different outcomes), then only the first is accepted. This prevents the financial institution from abstaining from processing deposits, and performing a rewind attack. To prevent the player from blocking casino deposits by the above mechanism, one can require the casino to verify with the financial institution that the player and casino have a consistent state before the casino allows the transfer of state.

Security

The illustrative embodiment of the invention provides a number of advantages in terms of security. Each of these is described below.

1. Public Verifiability. Assuming the non-forgeability of the signature scheme and that the hash function is a one-way function, the game-playing protocol of the illustrative embodiment satisfies public verifiability. This means that a third party (such as the financial institution) is always able to determine who won a particular game, given the corresponding game nodes with appropriate preimages revealed, and the paths from the game nodes to the root.

Since all game nodes are connected to a binary tree (each node of which is associated with a game node by means of a hash image of the latter), it is not possible to replace or alter a game node without finding a hash collision for at least one place on the path from the game node to the root. Therefore, since the signature on the set of roots cannot be forged, it is not possible for one participant to replace a game tree signed by the other. Furthermore, a participant can also not replace a game tree signed by itself, since the opponent has a copy of the original signature, and can submit that to the financial institution as evidence of the bait-and-switch attempt. Therefore, a completed game (corresponding to an honestly submitted transcript of the game) can always be evaluated by a third party, who can then determine the outcome of the game.

2. Fairness. Assuming the collision-freeness of the hash function h employed for the game tree, and that commitment C hides any partial information for committing the random coins, and the semantic security of the cipher, the game will be fair in that its outcome will be determined based on the agreed-upon rules, and on random strings of the correct distribution.

As described above, a participant commits to a game (without committing to play the game) by selecting a string, chosen uniformly at random from the set of strings of the appropriate length. The game is evaluated by evaluating the agreed-upon function (whether certified or merely recorded with the financial institution) on the two or more random strings provided by the two or more participants. The game function uses a random string that is a combination of the provided random strings. Therefore, if at least one of the strings is chosen uniformly at random, the output will be generated according to the agreed rules. If a participant does not select its string uniformly at random, this only provides an advantage to the opponent. Given that the cipher is assumed to be semantically secure, it is infeasible for the casino to determine the preimages of a player's game node from the information that player stores. Therefore, the casino cannot obtain an advantage (in making its decisions) from analysis of the stored information. Given the partial information hiding of the commitment C, it is not possible for either party to perform a bait-and-switch operation, having seen part of the game.

3. Robustness. As soon as a participant has committed to playing a game, it is possible for the financial institution to determine how to transfer funds according to the outcome of the game. If a participant withholds information from the financial institution, this cannot financially benefit that participant. It has already been established that the game is publicly verifiable. If a player halts the game before step 2 of the game-playing protocol, that player cannot guess the outcome of the game with a better probability than before the beginning of the game. If the player halts during step of the game-playing protocol, the deposited transcript can be evaluated by the financial institution, and will be charged according to the worst possible outcome for the player, unless the player submits information that allows the continuation of the game (in which case the game is not halted, but merely executed with the financial institution as an intermediary). If the player halts after step 2 of the game-playing protocol, the casino has all information required to perform a correct deposit. The casino cannot guess the outcome of the game with better probability than before the beginning of the game after having executed the first step of the protocol for playing a game. If the casino halts in the middle of step 2 or before concluding step 3 of the game-playing protocol, the game can be continued (if desired by the player) with the financial institution as an intermediary, and so, there is no financial incentive for the casino to halt in this manner. If the casino does not send the correct encrypted game node from its repository, the player can generate the information locally.

As is apparent from the foregoing description, the present invention provides techniques for implementing low-overhead secure information processing using lightweight devices. The techniques are low-overhead in that they require only very limited computational resources. The illustrative embodiment described above allows arbitrary disconnections of the lightweight devices, and provides the advantages of public verifiability, fairness and robustness for a wide variety of single-player and multi-player games. The invention is particularly well suited for use in secure mobile gaming applications, but can be used in a wide variety of other cryptographic applications, including contract signing and fair exchange of digital signatures.

It should be understood that the above-described embodiment of the invention is illustrative only. For example, the invention can be implemented using other types and arrangements of cryptographic techniques, and other configurations of processing devices. In addition, the techniques of the invention can be implemented with multiple players, with or without the involvement of a casino. More particularly, the setup procedure and game-playing protocol described above in conjunction with the illustrative embodiment may be readily adapted for game playing between two or more players without involvement of a casino. These and numerous other alternative embodiments within the scope of the following claims will be apparent to those skilled in the art.

What is claimed is:

1. A method for performing secure information processing operations utilizing a plurality of processing devices, the method comprising the steps of:
    performing a setup procedure to permit interactions of a designated type to be carried out between a first participant associated with at least a first one of the processing devices and a second participant associated with at least a second one of the processing devices;
    initiating in the first processing device a particular interaction with the second participant, by sending designated initiation information to the second processing device associated with the second participant, the particular interaction being configured based at least in part on one or more results of the setup procedure;
    receiving as part of the interaction response information from the second processing device associated with the second participant; and
    sending as part of the interaction additional information from the first processing device to the second processing device based at least in part on the received response information;
    wherein the interaction is configured such that the information exchanged between the first and second processing devices can be used to determine rights of the first and second participants in a publicly verifiable manner, the rights being based upon particular results of the interaction;
    wherein the interaction comprises a number of consecutive rounds of one or more decisions by each of the first participant and the second participant;
    wherein the interaction is characterized by a first free structure associated with the first participant and a second free structure associated with the second participant, each of the tree structures comprising a plurality of nodes, each of at least a subset of the nodes comprising a block of data that determines randomness contributed to a corresponding round of the interaction by the corresponding participant, wherein associated with each of at least a subset of the nodes are decision preimage values that encode possible decisions to be made in the interaction.

2. The method of claim 1 wherein the receiving and sending steps are repeated one or more times in accordance with specifications of the particular interaction.

3. The method of claim 1 wherein the first processing device comprises at least one lightweight device configured to communicate over a network with the second processing device.

4. The method of claim 1 wherein the particular interaction comprises secure mobile gaming interaction in which the first participant corresponds to a player and the second participant corresponds to a casino.

5. The method of claim 4 wherein the first processing device comprises a lightweight processing device associated with the player and the second processing device comprises at least one server associated with the casino.

6. The method of claim 1 wherein the particular interaction comprises secure mobile gaming interaction involving two or more players in which the first participant corresponds to a first player and the second participant corresponds to a second player.

7. The method of claim 1 wherein the particular interaction comprises secure contact signing interaction in which the first participant corresponds to a first party to the contract and the second participant corresponds to a second party to the contract.

8. The method of claim 1 wherein the particular interaction comprises secure digital signature exchange interaction in which the first participant corresponds to a first party to the digital signature exchange and the second participant corresponds to a second party to the digital signature exchange.

9. The method of claim 1 wherein security of the particular interaction is based at least in part on a secure probabilistic symmetric cipher (E,D) having semantic security operating in conjunction with a one-way hash function h for which collisions are intractable to find, and a commitment function C, wherein the commitment function C provides the public verifiability of designated portions of the interaction.

10. The method of claim 1 wherein the interaction is configured such that if at least one of the first and second processing devices is disconnected during the interaction, the interaction may upon reconnection of the device be continued from a designated point at or prior to the disconnection without the participants being able to alter any partial results of the interaction attributable to a portion of the interaction up to the designated point.

11. The method of claim 4 wherein the secure mobile gaming interaction comprises at least one game played by the player with the casino, the game comprising a number of consecutive rounds of one or more moves by each of the player and the casino, each of the rounds allowing the player and the casino to commit to at least one decision.

12. The method of claim 11 wherein the game is characterized by a player game tree structure associated with the player and a casino game tree structure associated with the casino, each of the game tree structures comprising a plurality of nodes, each of at least a subset of the nodes comprising a block of data that determines randomness contributed to a corresponding round of the game by the corresponding player or casino, wherein associated with each of at least a subset of the game nodes are decision preimage values that encode possible decisions to be made in the game.

13. The method of claim 12 wherein the setup procedure comprises at least the following steps:
   (a) the player selecting n random numbers $d_{i1}, \ldots, d_{in}$, for each node i of the player game free structure, and a random number $r_i$ uniformly at random for each node, wherein each node i corresponds to a particular round of the game;
   (b) the player computing for each node i a corresponding game node value $game_i = <h(D_{i1}, \ldots, D_{in}), R_i>$, where $D_{ij} = h(d_{ij})$, $R_i = C(r_i)$, h denotes a hash function, C denotes a commitment function, and $preimage_i = (d_{i1}, \ldots, d_{in}, r_i)$ denotes a decision preimage value for $game_i$;
   (c) the player computing for each node i a value which is a function of one or more of: (i) values associated with one or more of its children nodes; (ii) its corresponding game node value $game_i$; and (iii) a descriptor that identifies the game type;
   (d) both the player and the casino storing information of the form $agreement_{(casino,player)}$ comprising a root value of the player game free structure, a root value of the casino game tree structure, a hash value on a game function $f_{game}$, and associated digital signatures by the player and the casino.

14. The method of claim 12 wherein the secure mobile gaming interactions are implemented in accordance with a game-playing protocol comprising at least the following steps:
   (a) the player initiating the game by sending a value $r_{player,cnt}$ to the casino, where cnt corresponds to a counter;
   (b) the casino verifying that $r_{player,cnt}$ is a correct preimage to $R_{player,cnt}$, and halting the protocol if it is not the correct preimage;
   (c) the casino and the player taking turns making moves in which the casino sends to the player decision preimages encoding its move, the player is presented with one or more corresponding choices via an interface at the first processing device, and a given choice selected by the player is translated into one or more preimages that are subsequently sent to the casino;
   (d) step (c) being repeated one or more times in accordance with the rules of the game;
   (e) the casino sending a value $r_{casino,cnt}$ to the player, which is verified correspondingly by the player;
   (f) evaluating a game function $f_{games}$ on the disclosed portions of the player and casino preimages, presenting a corresponding output to the player and the casino, and sending appropriate payment transcripts to at least one financial institution; and
   (g) the player and the casino each updating the counter cnt, along with other state information associated with a current state of the game.

15. An apparatus for use in performing secure information processing operations, the apparatus comprising:
   a memory; and
   a processor coupled to the memory, the memory and processor being elements of a first processing device associated with a first participant, the processor being operative: (i) to perform a setup procedure to permit interactions of a designated type to be carried out between the first participant and a second participant associated with at least a second processing device; (ii) to initiate a particular interaction with the second participant, by sending designated initiation information to the second processing device associated with the second participant, the particular interaction being configured based at least in part on one or more results of the setup procedure; (iii) receiving as part of the interaction response information from the second processing device associated with the second participant, and (iv) sending as part of the interaction additional information from the first processing device to the second processing device based at least in part on the received response information;
   wherein the interaction is configured such that the information exchanged between the first and second processing devices can be used to determine rights of the first and second participants in a publicly verifiable manner, the rights being based upon particular results of the interaction;
   wherein the interaction comprises a number of consecutive rounds of one or more decisions by each of the first participant and the second participant;
   wherein the interaction is characterized by a first tree structure associated with the first participant and a second tree structure associated with the second participant, each of the tree structures comprising a plurality of nodes, each of at least a subset of the nodes comprising a block of data that determines randomness contributed to a corresponding round of the interaction by the corresponding participant, wherein associated with each of at least a subset of the nodes are decision preimage values that encode possible decisions to be made in the interaction.

16. The apparatus of claim 15 wherein receiving and sending operations (iii) and (iv) are repeated one or more times in accordance with specifications of the particular interaction.

17. The apparatus of claim 15 wherein the first processing device comprises at least one lightweight device configured to communicate over a network with the second processing device.

18. The apparatus of claim 15 wherein the particular interaction comprises secure mobile gaming interaction in which the first participant corresponds to a player and the second participant corresponds to a casino.

19. The apparatus of claim 18 wherein the first processing device comprises a lightweight processing device associated with the player and the second processing device comprises at least one server associated with the casino.

20. The apparatus of claim 15 wherein the particular interaction comprises secure mobile gaming interaction involving two or more players in which the first participant corresponds to a first player and the second participant corresponds to a second player.

21. The apparatus of claim 15 wherein the particular interaction comprises secure contract signing interaction in which the first participant corresponds to a first party to the contract and the second participant corresponds to a second party to the contract.

22. The apparatus of claim 15 wherein the particular interaction comprises secure digital signature exchange interaction in which the first participant corresponds to a first party to the digital signature exchange and the second participant corresponds to a second party to the digital signature exchange.

23. The apparatus of claim 15 wherein security of the particular interaction is based at least in part on a secure probabilistic symmetric cipher (E, D) having semantic security operating in conjunction with a one-way hash function h for which collisions are intractable to find, and a commitment function C, wherein the commitment function C provides the public verifiability of designated portions of the interaction.

24. The apparatus of claim 15 wherein the interaction is configured such that if at least one of the first and second processing devices is disconnected during the interaction, the interaction may upon reconnection of the device be continued from a designated point at or prior to the disconnection without the participants being able to alter any partial results of the interaction attributable to a portion of the interaction up to the designated point.

25. The apparatus of claim 18 wherein the secure mobile gaming interaction comprises at least one game played by the player with the casino, the game comprising a number of consecutive rounds of one or more moves by each of the player and the casino, each of the rounds allowing the player and the casino to commit to at least one decision.

26. The apparatus of claim 25 wherein the game is characterized by a player game tree structure associated with the player and a casino game tree structure associated with the casino, each of the game tree structures comprising a plurality of nodes, each of at least a subset of the nodes comprising a block of data that determines randomness contributed to a corresponding round of the game by the corresponding player or casino, wherein associated with each of at least a subset of the game nodes are decision preimage values that encode possible decisions to be made in the game.

27. An article of manufacture comprising a machine-readable storage medium for storing one or more programs for use in performing secure information processing operations utilizing a plurality of processing devices, wherein the one or more programs when executed implement the steps of:
  performing a setup procedure to permit interactions of a designated type to be carried out between a first participant associated with at least a first one of the processing devices and a second participant associated with at least a second one of the processing devices;
  initiating in the first processing device a particular interaction with the second participant, by sending designated initiation information to the second processing device associated with the second participant, the particular interaction being configured based at least in part on one or more results of the setup procedure;
  receiving as part of the interaction response information from the second processing device associated with the second participant; and
  sending as part of the interaction additional information from the first processing device to the second processing device based at least in part on the received response information;
  wherein the interaction is configured such that the information exchanged between the first and second processing devices can be used to determine rights of the first and second participants in a publicly verifiable manner, the rights being based upon particular results of the interaction;
  wherein the interaction comprises a number of consecutive rounds of one or more decisions by each of the first participant and the second participant;
  wherein the interaction is characterized by a first tree structure associated with the first participant and a second free structure associated with the second participant, each of the tree structures comprising a plurality of nodes, each of at least a subset of the nodes comprising a block of data that determines randomness contributed to a corresponding round of the interaction by the corresponding participant, wherein associated with each of at least a subset of the nodes are decision preimage values that encode possible decisions to be made in the interaction.

28. A method for performing secure information processing operations utilizing a plurality of processing devices including at least a first processing device associated with a first participant and a second processing device associated with a second participant, the method comprising the steps of:
  receiving from the first processing device in the second processing device designated initiation information initiating a particular interaction between the first participant and the second participant, the particular interaction being configured based at least in part on one or more results of a setup procedure, the setup procedure being performed by the first participant associated with the first processing device and permitting the particular interactions to be carried out between the first participant and the second participant;
  sending as part of the interaction response information from the second processing device associated with the second participant; and
  receiving as part of the interaction additional information sent from the first processing device to the second processing device based at least in part on the response information;
  wherein the interaction is configured such that the information exchanged between the first and second processing devices can be used to determine rights of the first and second participants in a publicly verifiable manner, the rights being based upon particular results of the interaction;
  wherein the interaction comprises a number of consecutive rounds of one or more decisions by each of the first participant and the second participant;
  wherein the interaction is characterized by a first tree structure associated with the first participant and a second tree structure associated with the second participant, each of the tree structures corn rinsing a plurality of nodes, each of at least a subset of the nodes comprising a block of data that determines randomness contributed to a corresponding round of the interaction by the corresponding participant, wherein associated with each of at least a subset of the nodes are decision preimage values that encode possible decisions to be made in the interaction.

* * * * *

UNITED STATES PATENT AND TRADEMARK OFFICE
CERTIFICATE OF CORRECTION

PATENT NO. : 7,340,058 B2
APPLICATION NO. : 09/844121
DATED : March 4, 2008
INVENTOR(S) : B. M. Jakobsson et al.

It is certified that error appears in the above-identified patent and that said Letters Patent is hereby corrected as shown below:

In the specification:

Column 6, line 40, delete "$d_{11},...,d_{1n},$" and insert --$d_{i1},...,d_{in},$--

Column 6, line 42, delete "$d_{11},...,d_{in}$" and insert --$d_{i1},...,d_{in}$--

Column 6, line 45, delete "$r_1$" and insert --$r_i$--

Column 6, line 51, delete "$game_1=<h(D_{11},...,D_{1n}), R_1>$" and insert --$game_i=<h(D_{i1},...,D_{in}), R_i>$--

Column 6, line 51, delete "$D_{1j}=h(d_{1j})$" and insert --$D_{ij}=h(d_{ij})$--

Column 6, line 52, delete "$R_1 + C(r_1)$" and insert --$R_i = C(r_i)$--

Column 6, line 52, delete "$preimage_1=(d_{11},...,d_{1n},r_1)$" and insert --$preimage_i=(d_{i1},...,d_{in},r_i)$--

Column 6, line 61, delete "$game_1$" and insert --$game_i$--

Column 7, line 31, delete "$E_1$" and insert --$E_i$--

Column 7, line 31, delete "$preimage_1$" and insert --$preimage_i$--

Column 7, line 32, delete "$red_1$" and insert --$red_i$--

Column 7, line 35, delete "$|red_1|=80$" and insert --$|red_i|=80$--

Column 7, line 36, delete "$red_1$" and insert --$red_i$--

Column 7, line 37, delete "$(i, E_1, game_{player,1}, game_{casino,1})$" and insert --$(i, E_i, game_{players,i}, game_{casino,1})$--

Column 7, line 59, delete "$preimage1=(d_{11},...,d_{1n},r_1)$" and insert --$preimage_i=(d_{i1},...,d_{in},r_i)$--

Column 7, line 62, delete "$(seed_{player}, game_1),$" and insert --$(seed_{player}, game_i),$--

UNITED STATES PATENT AND TRADEMARK OFFICE
CERTIFICATE OF CORRECTION

PATENT NO. : 7,340,058 B2
APPLICATION NO. : 09/844121
DATED : March 4, 2008
INVENTOR(S) : B. M. Jakobsson et al.

It is certified that error appears in the above-identified patent and that said Letters Patent is hereby corrected as shown below:

In the claims:

Claim 1, column 15, line 61, delete "free" and insert --tree--

Claim 1, column 15, line 63, delete "free" and insert --tree--

Claim 13, column 17, line 7, delete "free" and insert --tree--

Claim 13, column 17, line 24, delete "free" and insert --tree--

Claim 27, column 20, line 6, delete "free" and insert --tree--

Signed and Sealed this

Twelfth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,340,058 B2
APPLICATION NO. : 09/844121
DATED : March 4, 2008
INVENTOR(S) : B. M. Jakobsson et al.

It is certified that error appears in the above-identified patent and that said Letters Patent is hereby corrected as shown below:

In the specification:

Column 6, line 40, delete "$d_{11},...,d_{1n},$" and insert --$d_{i1},...,d_{in},$--

Column 6, line 42, delete "$d_{11},...,d_{in}$" and insert --$d_{i1},...,d_{in}$--

Column 6, line 45, delete "$r_1$" and insert --$r_i$--

Column 6, line 51, delete "$game_1=<h(D_{11},...,D_{1n}), R_1>$" and insert --$game_i=<h(D_{i1},...,D_{in}), R_i>$--

Column 6, line 51, delete "$D_{1j}=h(d_{1j})$" and insert --$D_{ij}=h(d_{ij})$--

Column 6, line 52, delete "$R_1 + C(r_1)$" and insert --$R_i = C(r_i)$--

Column 6, line 52, delete "$preimage_1=( d_{11},...,d_{1n},r_1)$" and insert --$preimage_i=( d_{i1},...,d_{in},r_i)$--

Column 6, line 61, delete "$game_1$" and insert --$game_i$--

Column 7, line 31, delete "$E_1$" and insert --$E_i$--

Column 7, line 31, delete "$preimage_1$" and insert --$preimage_i$--

Column 7, line 32, delete "$red_1$" and insert --$red_i$--

Column 7, line 35, delete "$|red_1|=80$" and insert --$|red_i|=80$--

Column 7, line 36, delete "$red_1$" and insert --$red_i$--

Column 7, line 37, delete "$(i, E_1, game_{player,1}, game_{casino,1})$" and insert --$(i, E_i, game_{players,i}, game_{casino,i})$--

Column 7, line 59, delete "$preimage1=(d_{11},...,d_{1n},r_1)$" and insert --$preimage_i=(d_{i1},...,d_{in},r_i)$--

Column 7, line 62, delete "$(seed_{player}, game_1),$" and insert --$(seed_{player}, game_i),$--

UNITED STATES PATENT AND TRADEMARK OFFICE
CERTIFICATE OF CORRECTION

PATENT NO. : 7,340,058 B2
APPLICATION NO. : 09/844121
DATED : March 4, 2008
INVENTOR(S) : B. M. Jakobsson et al.

It is certified that error appears in the above-identified patent and that said Letters Patent is hereby corrected as shown below:

In the claims:

Claim 1, column 15, line 61, delete "free" and insert --tree--

Claim 1, column 15, line 63, delete "free" and insert --tree--

Claim 13, column 17, line 7, delete "free" and insert --tree--

Claim 13, column 17, line 24, delete "free" and insert --tree--

Claim 27, column 20, line 6, delete "free" and insert --tree--

This certificate supersedes the Certificate of Correction issued August 12, 2008.

Signed and Sealed this

Twenty-third Day of September, 2008

JON W. DUDAS
*Director of the United States Patent and Trademark Office*